(12) United States Patent
Engel et al.

(10) Patent No.: US 8,834,581 B2
(45) Date of Patent: Sep. 16, 2014

(54) DISAZO DYES, PREPARATION AND USE

(75) Inventors: Aloysius Engel, Köln (DE); Michael Joerss, Leverkusen (DE); Clemens Grund, Hattersheim (DE); Bernd Hostasch, Waldbröl (DE); Gunter Görlitz, Bad Soden (DE)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 13/996,824

(22) PCT Filed: Dec. 17, 2011

(86) PCT No.: PCT/EP2011/006397
§ 371 (c)(1),
(2), (4) Date: Aug. 29, 2013

(87) PCT Pub. No.: WO2012/084171
PCT Pub. Date: Jun. 28, 2012

(65) Prior Publication Data
US 2013/0333123 A1    Dec. 19, 2013

(30) Foreign Application Priority Data
Dec. 24, 2010    (DE) .......................... 10 2010 056 305

(51) Int. Cl.
*D06P 1/02*    (2006.01)
*C07C 245/08*    (2006.01)
*C09B 31/04*    (2006.01)
*C09B 31/153*    (2006.01)
*C09D 11/328*    (2014.01)

(52) U.S. Cl.
CPC ............... *C09B 31/04* (2013.01); *C09B 31/153* (2013.01); *C09D 11/328* (2013.01)
USPC ............. 8/636; 8/637.1; 8/639; 8/640; 8/641; 534/550

(58) Field of Classification Search
USPC ........... 8/636, 637.1, 639, 640, 641; 534/550
See application file for complete search history.

(56) References Cited

U.S. PATENT DOCUMENTS

| 3,853,895 A | 12/1974 | Lamm et al. |
| 3,907,769 A | 9/1975 | Dehnert et al. |
| 6,605,126 B1 | 8/2003 | Xia et al. |

FOREIGN PATENT DOCUMENTS

| DE | 2216570 A1 | 10/1973 | |
| DE | 2234621 A1 | 1/1974 | |
| DE | 2308663 A1 | 8/1974 | |
| GB | 1414687 | * 11/1975 | .............. C09B 29/36 |
| GB | 1414687 A | 11/1975 | |

OTHER PUBLICATIONS

STIC Search Report dated Sep. 27, 2013.*
International Search Report for PCT/EP2011/006397 mailed Apr. 2, 2012.

* cited by examiner

*Primary Examiner* — Eisa Elhilo
(74) *Attorney, Agent, or Firm* — Drinker Biddle & Reath LLP

(57) ABSTRACT

Described are dyes of formula (I) where $R^1$ is hydrogen, alkyl, alkoxy, trifluoromethyl or halogen, M is hydrogen, an alkali metal cation or an optionally substituted ammonium cation, $R^2$ and $R^3$ are each independently hydrogen, alkyl or alkoxy, $R^4$ is alkyl or alkoxy, $R^5$ and $R^6$ are each independently moieties of the formula —$(C_mH_{2m})$—O—$C_nH_{2n+1}$, m is an integer from 3 to 6, and n is an integer from 0 to 8. These dyes are useful for dyeing and printing materials having polar groups.

(I)

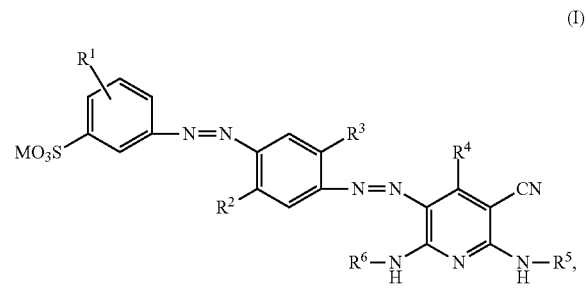

20 Claims, No Drawings

DISAZO DYES, PREPARATION AND USE

CROSS-REFERENCE TO RELATED APPLICATIONS

This application is a national stage application (under 35 U.S.C. §371) of PCT/EP2011/006397, filed Dec. 17, 2011, which claims benefit of German Application No. 10 2010 056 305.6, filed Dec. 24, 2010 which are both incorporated by reference.

The present invention resides in the field of acid dyes and relates to novel disazo dyes and also to their preparation and use.

DE 22 16 570 A and DE 22 34 621 A disclose structurally similar dyes. These dyes are notable for high fastnesses and especially for high lightfastnesses.

There is still a need for improved dyes that have particularly high fastnesses.

It has been found that selected dyes combine very high fastnesses with desired coloristic properties (locus in color space).

The present invention provides dyes of formula (I)

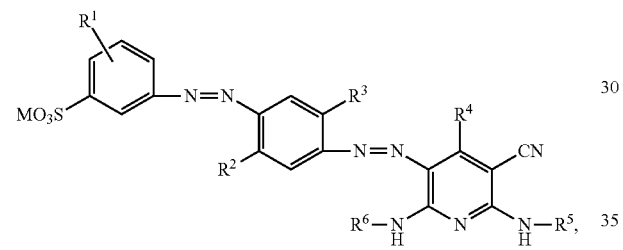

where
$R^1$ is hydrogen, alkyl, alkoxy, trifluoromethyl or halogen,
M is hydrogen, an alkali metal cation or an optionally substituted ammonium cation,
$R^2$ and $R^3$ are each independently hydrogen, alkyl or alkoxy,
$R^4$ is alkyl or alkoxy,
$R^5$ and $R^6$ are each independently moieties of the formula
—$(C_mH_{2m})$—O—$C_nH_{2n+1}$,
m is an integer from 3 to 6 and preferably from 3 to 4, and
n is an integer from 0 to 8 and preferably from 1 to 6.

In the abovementioned definitions, alkyl groups may be straight-chain or branched and represent for example methyl, ethyl, n-propyl, isopropyl, n-butyl, isobutyl, hexyl, such as n-hexyl, heptyl, such as n-heptyl, octyl, such as n-octyl and isooctyl or 2-ethylhexyl, nonyl, such as n-nonyl, decyl, such as n-decyl, dodecyl, such as n-dodecyl, hexadecyl, such as n-hexadecyl and octadecyl, such as n-octadecyl. The same logic applies to alkoxy groups. Preference is given to alkyl groups or alkoxy groups having 1 to 4 carbon atoms.

Halogen is fluorine, chlorine, bromine or iodine, especially fluorine, chlorine or bromine.

Alkali metal cations are in particular lithium, sodium or potassium cations, more preferably sodium cations.

Optionally substituted ammonium cations in particular are unsubstituted ammonium cations or ammonium cations substituted with one to four monovalent organic moieties, especially with alkyl and/or aryl moieties.

Preference is given to dyes of formula I where $R^1$ is hydrogen.

Preference is likewise given to dyes of formula I where M is hydrogen, a lithium, sodium or potassium cation or an unsubstituted ammonium cation.

Preference is further given to dyes of formula I where $R^2$, $R^3$ and $R^4$ are each independently $C_1$-$C_4$ alkyl and more particularly methyl.

Preference is further given to dyes of formula I where m is=3 and n is=1, more particularly dyes of formula I where $R^5$ and $R^6$ are each moieties of the formula —$(CH_2)_3$—O—$CH_3$.

Very particular preference is given to dyes of formula I where
$R^1$ is hydrogen,
M is hydrogen, a sodium or potassium cation or an unsubstituted ammonium cation,
$R^2$, $R^3$ and $R^4$ are each independently methyl, and
$R^5$ and $R^6$ are each moieties of the formula —$(CH_2)_3$—O—$CH_3$.

The dyes of the present invention are obtainable by commonly known methods, for example as described in DE 22 16 570 A.

The process for preparing dyes of formula I in a manner according to the present invention comprises the reaction of compounds of formulae II and III in a conventional manner

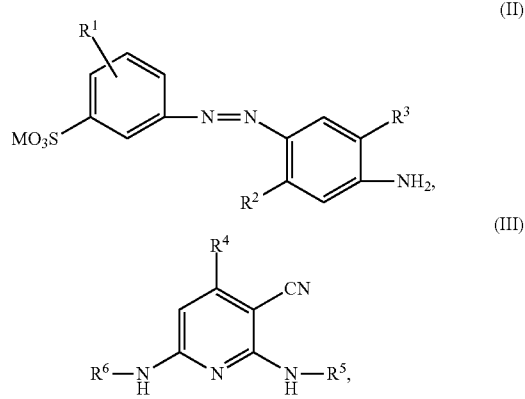

where $R^1$, M, $R^2$, $R^3$, $R^4$, $R^5$, $R^6$ are each as defined above.

The compounds of formulae II and III are known per se or are obtainable by methods known per se. Examples of compounds of formulae II and III and also of their methods of making are found in DE 22 16 570 A.

The compounds of formula III can be synthesized using different amines $R^5$—$HN_2$ and $R^6$—$NH_2$. This generally generates positional isomers which are useable as such in the coupling reaction with compounds of formula II and which lead directly to dye mixtures.

The dyes of the present invention are also obtainable in the form of a solution or suspension and can be isolated by salting out. They can also be spray dried, but evaporating the solution or the suspension is also possible.

The dyes of the present invention are generally present in the form of a solid or liquid formulation. In solid form, they generally contain the electrolyte salts which are typical in the case of water-soluble dyes, such as sodium chloride, potassium chloride and sodium sulfate.

The present invention also provides mixtures between the dyes of formula I according to the present invention and also mixtures of one or more dyes of formula I with one or more dyes miscible therewith. The respective mixing ratios can vary within wide limits.

The dyes of formula I according to the present invention can be used directly for polymer coloration or they can be subjected to finishing, i.e., conversion into a commercial dye preparation.

Finishing can be effected by proceeding from a single dye of formula I or from a mixture of two or more dyes of formula I or mixtures of one or more dyes of formula I and dyes of other dye classes, optionally with the assistance of auxiliaries, for example surface modifiers and dispersants, by dispersing, suspending or dissolving in a liquid or solid carrier material and also, optionally, standardizing to a desired color strength and a desired hue and, optionally, drying the preparation thus obtained.

Examples of additives are the auxiliaries customary in commercial dyes, such as buffers capable of setting a pH between 3 and 7 in an aqueous solution for example. Examples thereof are sodium acetate, sodium borate, sodium bicarbonate, sodium dihydrogenphosphate, sodium tricitrate and disodium hydrogenphosphate.

Further examples of customary auxiliaries are siccatives, which are generally used in small amounts, or biocides, for example antifungally active agents. These are preferably used in liquid formulations. Dye formulations may further contain thickeners, for example in the case of formulations used as print pastes.

Preparations containing dyes of formula I can also contain auxiliaries to modify the viscosity/flowability.

Suitable auxiliaries of this kind are described in U.S. Pat. No. 6,605,126 for example. Preferred examples are ethylene glycols, propylene glycols, polyether polyols, polyester polyols, lactones and carbonic esters.

The present invention accordingly also provides dye preparations containing one or more dyes of formula I and also one or more conventional auxiliaries.

These dye preparations preferably contain one or more dyes of formula I in amounts of 5% to 100% by weight and one or more conventional auxiliaries in amounts of 0% to 95% by weight, all based on the dye preparation.

The present invention further provides for the use of the dyes of formula I for dyeing or printing materials comprising polar groups.

Examples of polar groups are carboxamide, hydroxyl, amino, ammonium, carboxyl, sulfonic acid, ester, urethane or urea groups.

Examples of materials having polar groups are polymers having such groups, such as polyamides, polyurethanes or cellulose or paper or leather or silk or wool.

The useful performance characteristics of the dyes of formula I according to the present invention become particularly manifest on dyeing or printing carboxamido- and/or hydroxyl- or amino-containing materials. These materials can be for example in the form of sheetlike structures, such as paper, leather or polymeric films, for example polyamide films.

But the dyes of formula I according to the present invention can also be used for mass coloration, for example for mass coloration in polymers having polar groups, such as polyamide materials or such as polyurethane materials, especially in the form of fibers of the materials mentioned.

The use according to the present invention can be effected by admixing the dye of formula I to the polymer to be colored.

The dye of the present invention is preferably in the form of a pulverulent or granular dye having a 5% to 80% by weight content, based on the pulverulent or granular material. Granules are particularly from 50 to 500 μm in size. When the dyes are in a liquid formulation, the total dye content of these liquid, preferably aqueous, solutions would be up to about 50% by weight, for example between 5% and 50% by weight, in which case the electrolytic salt content of the aqueous solutions is preferably below 10% by weight, based on the aqueous solution.

The dyes of the present invention are particularly useful for dyeing or printing polyamide fibers or blend fabrics of polyamide with cotton or with polyester fibers.

It is also possible to print textiles or paper with the dyes of the present invention, in which case different printing processes, but especially the inkjet process, can be used.

The present invention thus also provides for the use of the dyes of the present invention for dyeing or printing the materials mentioned, that is processes for dyeing or printing such materials in a conventional manner where the dyes of the present invention are used as colorants.

Advantageously, the as-synthesized solutions of the dyes according to the present invention can be used directly as a liquid preparation for dyeing, optionally after addition of at least one buffer and optionally after concentrating or diluting.

The materials mentioned are preferably used in the form of fiber materials, especially in the form of textile fibers or textile fabrics, such as wovens, or of yarns, which are in the form of hanks or wound packages for example.

The carboxamido-containing materials which are preferably used include for example synthetic and natural polyamides and polyurethanes, especially in the form of fibers, for example wool and other animal hairs, silk, leather, nylon-6,6, nylon-6, nylon-11 and nylon-4.

The dyes of the present invention can be applied to and fixed on the substrates mentioned, especially on the fiber materials mentioned, by the application techniques known for water-soluble dyes and especially for acid dyes.

Wool which is being given a nonfelting or low-felting finish (cf. for example H. Rath, Lehrbuch der Textilchemie, Springer-Verlag, $3^{rd}$ edition (1972), pp. 295-299, especially finished by the Hercosett process (p. 298); J. Soc. Dyers and Colorists 1972, 93-99, and 1975, 33-44) can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or based on a reaction product of for example stearylamine with ethylene oxide. For instance, the dye mixture of the present invention is preferably subjected to the exhaust process initially from an acidic dyebath having a pH of about 3.5 to 5.5 under pH control.

The procedure described here also applies to the production of dyeings on fiber materials composed of other natural polyamides or of synthetic polyamides and polyurethanes. These materials can be dyed using the customary dyeing and printing processes described in the literature and known to one skilled in the art (see for example H.-K. Rouette, Handbuch der Textilveredlung, Deutscher Fachverlag GmbH, Frankfurt/Main).

The dyeing liquors and print pastes may contain further additives in addition to dyes and water. Additives are for example wetting agents, anti-foams, leveling agents and agents which influence the properties of the textile material, such as softeners, flame retardants and soil, water and oil rejecting or water-softening agents. Print pastes in particular may also contain natural or synthetic thickeners, for example alginates and cellulose ethers. The dye quantities in the dyebaths and print pastes can vary within wide limits according to the desired depth of shade. In general, the dye is present in amounts of 0.01% to 15% by weight and especially in amounts of 0.1% to 10% by weight, based on the material to be dyed or the print paste.

The dyes of the present invention are notable for good fixing, very good buildup and also high fastness to light and perspiration-light and high brilliance.

The dyeings and prints obtained with the dyes of the present invention on polyamides in particular have high color strength and a high fiber-dye bond stability in both the acidic and alkaline region and also good lightfastness and very good wetfastness properties, such as fastness to washing, water, seawater, overdyeing and perspiration and also good fastness to pleating, hot pressing and crocking.

The present invention further provides for the use of the abovementioned dyes in printing inks or pastes for textile printing, especially for digital textile printing, and most preferably for textile printing by the inkjet process.

The quantities in which the dyes mentioned are present in the printing inks used according to the present invention are for example in the range from 0.1% by weight to 50% by weight, preferably in the range from 1% by weight to 30% by weight and more preferably in the range from 1% by weight to 15% by weight based on the total weight of the ink. The inks may likewise contain combinations of the dyes mentioned with other acid dyes used in textile printing. To use the inks in the continuous flow process, an electrolyte can be added to set a conductivity in the range from 0.5 to 25 mS/m.

Lithium nitrate and/or potassium nitrate are useful as electrolyte for example.

The dye inks used according to the present invention may contain organic solvents to a total amount of 1-50% and preferably 5-30% by weight.

Examples of suitable organic solvents are alcohols, polyalkylene glycols, lower alkyl ethers of polyhydric alcohols, amines, urea or urea derivatives, amides, ketones or keto alcohols, cyclic ethers or moreover sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy) ethanol, 2-(2-ethoxyethoxy)ethanol, 2-(2-butoxyethoxy) ethanol, 2-(2-propoxyethoxy)ethanol, pyridine, piperidine, butyrolactone, trimethylpropane, 1,2-dimethoxypropane, dioxane, ethyl acetate, ethylenediamine tetraacetate, ethyl pentyl ether, 1,2-dimethoxypropane, trimethylpropane.

The printing inks used according to the present invention may further contain the customary added substances, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Suitable viscosity moderators are rheological additives for example: polyvinylcaprolactam, polyvinylpyrrolidone and also their copolymers polyether polyol, associative thickeners, polyurea, polyurethane, sodium alginates, modified galactomannans, polyetherurea, polyurethane, nonionic cellulose ethers.

By way of further additives, the inks of the present invention may contain surface-active substances to set surface tensions in the range from 20 to 65 mN/m, which are optionally conformed depending on the process used (thermal or piezo technology).

Examples of suitable surface-active substances are surfactants of any kind, preferably nonionic surfactants, butyldiglycol, 1,2-hexanediol.

The inks may further contain customary additives, for example substances for inhibiting fungal and bacterial growth in amounts of 0.01% to 1% by weight based on the total weight of the ink.

The inks are obtainable in a conventional manner by mixing the components in water.

The dye inks used according to the present invention are particularly useful in inkjet printing processes for printing a wide variety of prefinished materials, such as silk, leather, wool, cellulosic fiber materials of any kind and polyurethanes, and especially polyamide fibers. The printing inks of the present invention are also useful for printing pretreated hydroxyl-containing and/or amino-containing fibers present in blend fabrics, for example mixtures of cotton, silk, wool with polyester fibers or polyamide fibers.

The prints obtained with the dye inks used according to the present invention on polyamide in particular have high color strength and a high fiber-dye bond stability in both the acidic and alkaline region and also good lightfastness and very good wetfastness properties, such as fastness to washing, water, seawater, overdyeing and perspiration and also good fastness to pleating, hot pressing and crocking The examples which follow serve to elucidate the invention without being limited to these examples. Parts are parts by weight and percentages are percentages by weight, unless otherwise stated. Parts by weight relate to parts by volume like the kilogram to the liter.

The compound described in the examples is shown in form of the free acid. In general, however, it will be prepared and isolated in the form of its alkali metal salts, such as lithium, sodium or potassium salts, and used for dyeing in the form of its salts.

EXAMPLES

Synthesis Example

A dye of the present invention, namely 3-{4-[5-cyano-2,6-bis-(3-methoxypropylamino)-4-methylpyridin-3-ylazo]-2,5-dimethylphenylazo}benzenesulfonic acid, was prepared similarly to the methods described in DE 22 16 570 A by diazotizing 3-(4-amino-2,5-dimethylphenylazo)benzenesulfonic acid and coupling the resulting diazonium salt onto 2,6-bis-(3-methoxypropylamino)-4-methylnicotinonitrile. A red dye was obtained ($\lambda_{max}$=465 nm).

Dyeing Example 1

One part of the dye from the synthesis example according to the present invention was dissolved in 2000 parts of water and 5 parts of sodium sulfate, 1 part of a leveling agent (based on a condensation product formed from a higher aliphatic amine and ethylene oxide) and also 5 parts of sodium acetate were added.

The pH was then adjusted to a value of 4.5 using acetic acid (60%). The dyebath was heated to 50° C. for 10 minutes and then 100 parts of a woven wool fabric were added. The dyebath was heated to a temperature of 100° C. in the course of 50 minutes and dyeing was carried out at this temperature for 60 minutes. Thereafter, the dyebath was cooled down to 70° C. and the dyed material was removed. The woven wool fabric was rinsed with hot and cold water, subsequently hydroextracted and dried. A red dyeing having good light- and wetfastnesses and also good levelness in the fiber was obtained.

Dyeing Example 2

One part of the dye from the synthesis example according to the present invention was dissolved in 2000 parts of water, 1 part of a leveling agent (based on a condensation product formed from a higher aliphatic amine and ethylene oxide) and also 5 parts of sodium acetate were added. The pH was then adjusted to a value of 5 using acetic acid (60%). The dyebath was heated to 50° C. for 10 minutes and then 100 parts of a woven polyamide fabric were added. The dyebath was heated to a temperature of 110° C. in the course of 50 minutes and dyeing was carried out at this temperature for 60 minutes. Thereafter, the dyebath was cooled down to 60° C. and the dyed material was removed. The woven polyamide fabric was rinsed with hot and cold water, subsequently hydroextracted and dried. A red dyeing having good light- and wetfastnesses and also good levelness in the fiber was obtained.

What is claimed is:

1. A dye of formula (I)

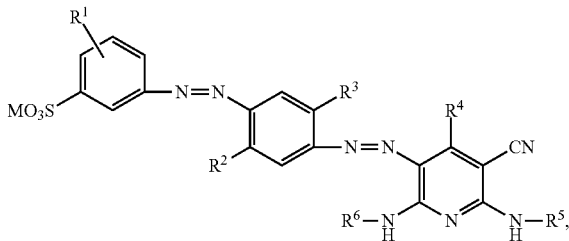

(I)

where
$R^1$ is hydrogen, alkyl, alkoxy, trifluoromethyl or halogen,
M is hydrogen, an alkali metal cation or an optionally substituted ammonium cation,
$R^2$ is alkyl or alkoxy,
$R^3$ is hydrogen, alkyl or alkoxy,
$R^4$ is alkyl or alkoxy,
$R^5$ and $R^6$ are each independently moieties of the formula
—$(C_mH_{2m})$—O—$C_nH_{2n+1}$,
m is an integer from 3 to 6, and
n is an integer from 0 to 8.

2. The dye as claimed in claim 1, wherein m is an integer from 3 to 4 and n is an integer from 1 to 6.

3. The dye as claimed in claim 1, wherein $R^1$ is hydrogen.

4. The dye as claimed in claim 1, wherein M is hydrogen, a lithium, sodium or potassium cation or an unsubstituted ammonium cation.

5. The dye as claimed in claim 1, wherein $R^2$, $R^3$ and $R^4$ are each independently $C_1$-$C_4$ alkyl.

6. The dye as claimed in claim 1, wherein $R^2$, $R^3$ and $R^4$ are each methyl.

7. The dye as claimed in claim 1, wherein m is=3 and n is=1.

8. The dye as claimed in claim 7, wherein $R^5$ and $R^6$ are each moieties of the formula —$(CH_2)_3$—O—$CH_3$.

9. The dye as claimed in claim 1, wherein
$R^1$ is hydrogen,
M is hydrogen, a lithium, sodium or potassium cation or an unsubstituted ammonium cation,
$R^2$, $R^3$ and $R^4$ are each independently methyl, and
$R^5$ and $R^6$ are each moieties of the formula —$(CH_2)_3$—O—$CH_3$.

10. A process for preparing the dye of formula I as claimed in claim 1 comprising reacting compounds of formulae II and III

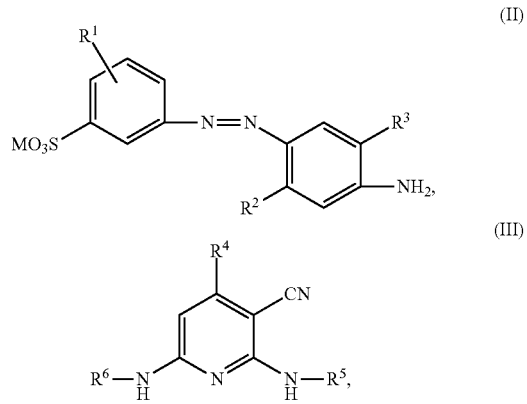

where $R^1$, M, $R^2$, $R^3$, $R^4$, $R^5$, $R^6$ are each as defined in claim 1.

11. A dye preparation comprising one or more dyes of formula I as claimed in claim 1 and also one or more auxiliaries.

12. A process for dyeing or printing materials comprising polar groups which comprises adding the dye as claimed in claim 1.

13. The process as claimed in claim 12, wherein the material comprises carboxamide, hydroxyl, amino, carboxyl, sulfonic acid, urethane and/or urea groups.

14. The process as claimed in claim 12, wherein the material comprises polyamides, polyurethanes or cellulose.

15. The process as claimed in claim 12, wherein the material comprises paper, leather, silk or wool.

16. The process as claimed in claim 12, wherein materials comprising polar groups comprise polyamide fibers or blend fabrics of polyamide fibers with cotton and/or with polyester fibers, or wherein materials comprising polar groups are used in the form of fiber materials.

17. The process as claimed in claim 12, wherein materials are in the form of textile fibers.

18. The process as claimed in claim 12, wherein materials comprising polar groups comprise textiles or paper which are printed.

19. The process as claimed in claim 12, wherein materials are in the form of hanks or wound packages.

20. A printing ink for digital textile printing which comprises the dye as claimed in claim 1.

* * * * *